May 7, 1940.  G. M. WALRAVEN  2,199,380
METAL PANEL CUTTER
Filed July 6, 1937
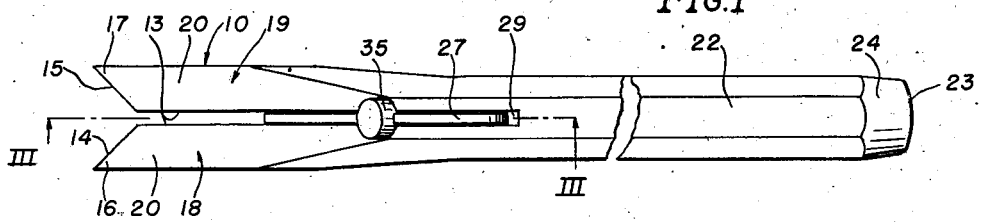
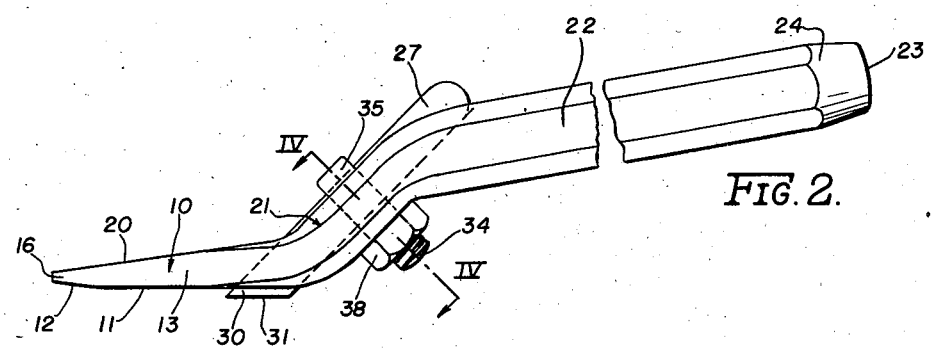
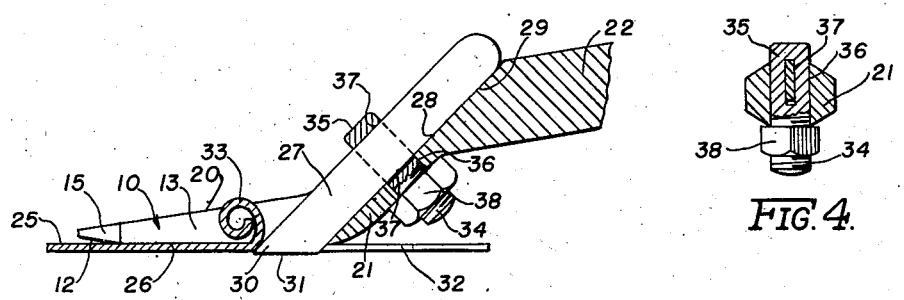 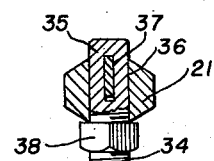
INVENTOR.
GEORGE M. WALRAVEN
BY
ATTORNEY.

Patented May 7, 1940

2,199,380

UNITED STATES PATENT OFFICE 2,199,380

METAL PANEL CUTTER

George M. Walraven, Kenosha, Wis., assignor to Snap-On Tools, Inc., Kenosha, Wis., a corporation of Delaware Application July 6, 1937, Serial No. 152,067

4 Claims. (Cl. 30—168)

This invention relates to panel surface cutting devices and more particularly to metal panel cutters, although certain features thereof may be employed with equal advantage for other purposes.

It contemplates more especially the provision of a cutting tool that is readily displaced over a flat surface to remove any area thereof without entailing much time, effort or labor.

Numerous types of cutters have heretofore been proposed, but these have not proven entirely satisfactory for removing portions of panels so that a defective region thereof may be corrected or suitably patched without requiring an entirely new piece of sheet material or metal panel. In straightening out automobile bodies, there are times when an area thereof is so completely defective through injury that it is impossible to correct same with any degree of perfection. It is necessary, therefore, to remove the defective section or area so that a tool has been provided to provide a clean slit in a surface so that it can be displaced thereover to remove any desired or predetermined area thereof.

One object of the present invention is to simplify the construction and improve the operation of devices of the character mentioned.

Another object is to provide a simple and more effective panel cutting tool that is easily displaced over a surface for removing any portion thereof.

Still another object is to provide a panel cutter of the chisel type that is readily manipulated to remove any portion of a panel and define a clean edge for repair, patching or other correction as commercial practice may dictate.

A further object is to provide a simple and improved panel cutting tool that has an adjustably mounted cutter displaced over a surface by resort to the repeated impacts of a hammer.

A still further object is to provide a panel cutting tool having a substantially flat surface that is displaced over a panel to carry a cutter that defines a clean and narrow slit in a flat or curved surface.

Still a further object is to provide a simple, inexpensive and effective tool that is easily displaced over a surface to remove any portion thereof.

Other objects and advantages will appear from the following description of an illustrative embodiment of the present invention.

In the drawing:

Figure 1 is a fragmentary plan view of a device embodying features of the present invention.

Figure 2 is a fragmentary side view in elevation of the device shown in Figure 1.

Figure 3 is a sectional view taken substantially along line III—III of Figure 1.

Figure 4 is a sectional view taken substantially along line IV—IV of Figure 2.

The structure selected for illustration comprises an elongated member 10 having a substantially flat bottom surface 11 that terminates in upwardly inclined extremities 12. As shown, the head 10 is bifurcated along a longitudinal median line to present an open groove 13 communicating with the extremity thereof. The extremities of the furcated head 10 presents converging extreme edges 14 and 15 defining pointed extremities 16 and 17, respectively. The pointed extremities 16 and 17 have the upwardly inclined surface 12 described supra, and these are provided on the bifurcations 18 and 19 defining the head 10 with the longitudinal median groove 13 therein.

The top surfaces 20 of the bifurcations 18 and 19 are downwardly inclined toward the extremities 16 and 17 thereof, and the entire head 10 merges with the upwardly inclined shank 21 formed integral therewith to terminate in a substantially elongated handle member 22 that serves as a hammer impacting expedient to displace the head 10 over a curved or flat surface as will appear more fully hereinafter. The head 10, shank 21 and handle member 22 are preferably though not essentially stamped, forged or otherwise shaped from a single piece of material to present a cutter holder.

It is to be noted that the impacting extremity 23 of the handle chamber 22 is chamfered as at 24 to provide an end surface that will not be irregularly swaged responsive to repeated impacts by a hammer head or similar tool. With this arrangement, it will be noted that the longitudinal axis of the handle member 22 is in substantially a plane parallel to the substantially flat bottom surface 11 of the head 10 so that impacts directed against the handle extremity 23 will tend to displace the head 10 over a surface 25 of a sheet of material 26 that is to have an area or portion thereof removed in a manner that will appear more fully hereinafter.

To this end, a flat substantially thin cutting blade 27 has its bottom longitudinal edge 28 mounted in an inclined slot 29 stamped or otherwise formed in the inclined shank 21 for the entire length thereof to present a sharp oblique cutting extremity 30 in the groove 13 and between the furcations presented by the portions 18 and 19 of the head 10. Because the shank 21 is inclined or on the bias, the blade extremity 30 has a cutting edge 31 thereof at an angle substantially greater than the angle presented by the inclination of the shank 21 with the flat surface 25 upon which the flat surface 11 of the head 10 rests.

This will present the cutting point 30 beyond the bottom surface 11 of the head 10 and effectively cut a slit 32 in the sheet material 26 with the chip 33 curled between the furcations 18 and 19 within the groove 13 of the head 10 to avoid obstruction to the continued displacement of the cutting blade 27 thereof. The chip 33 assumes the shape of a convolution and constitutes the material from which the slit 32 is provided in the sheet material 26 in order to effectively remove any defective area or portion thereof.

In order to adjustably secure the cutting blade 27 in the desired position, a threaded rod 34 terminates in a cylindrical body 35 of substantially rectangular cross-section for reception in a correspondingly shaped aperture 36 formed transversely through the shank 21 and communicating with the blade receiving longitudinal slot 29. The blade engaging body 35 is provided with a rectangular slot 37 somewhat larger in cross-section than the blade 27 which is freely disposed therethrough when lodged in the longitudinal slot 29 provided in the shank 21.

A nut 38 threadedly engages the shank 34 to secure the blade 27 in any desired adjustable position along the inclined slot 29 so that its extremity 30 may be adjusted to the desired extent beyond the bottom flat surface 11 of the head 10 and between the bifurcations 18 and 19 therein. It will be observed that the substantially flat bottom surface 11 of the head 10 will serve as a rest therefor and determine the position of the handle member 22 that receives impacts at its extremity 23 from the hammer to displace the head 10 with its cutter blade 27 along a surface to provide a clean supporting slot 32 corresponding in width to the blade cutter edge 30.

The head 10 may be guided along any desired course and is intended to remove the defective portions of a sheet of material that is to be repaired such as an automobile body and the like that is damaged and requires correction by patching or otherwise. A tool of this character is desirable to remove the defective area in sheet steel when such has been damaged to such an extent that will not enable its repair without a new patch or substitute sheet of material inserted in the region that has been removed.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device of the character described, the combination with an elongated member having a furcated flat bottom surface for traversing over a surface to be slitted, of an upwardly inclined handle member formed on said elongated surface member, a surface slitting tool mounted between the furcations of said surface member, slotted means for receiving and adjustably mounting said slitting tool relative to said flat surface member, and fastener means for said slotted means so that the cutting edge thereof is adjustably disposed below the flat bottom surface of said elongated member for slitting responsive to movement imparted through said handle member with the flat surface of said first named elongated member in contact with the surface to be slitted.

2. In a device of the character described, the combination with a substantially rectangular flat plate member having an elongated furcated flat bottom surface for traversing over a surface to be slitted, of an upwardly inclined handle member integrally extending from the extremity of said substantially rectangular plate member and constituting a furcated extension of said furcated flat bottom surface, a surface slitting tool mounted between the furcations of said surface member, fastener screw means extending between the furcations of said upwardly inclined handle member for adjustably mounting said slitting tool along said upwardly inclined handle member so that the cutting edge thereof is disposed between said furcations and below said surface for slitting responsive to movement imparted by hammer impacts against the extremity of said handle member to displace said surface member with said slitting tool over a flat surface to be slitted.

3. In a device of the character described, the combination with an elongated furcated surface plate member for traversing over a surface to be slitted, of an upwardly inclined furcated shank extending from said surface member, a handle member connected to said inclined shank, a slitting tool mounted between the furcations of said inclined shank to project between the furcations of said surface member so that its cutting edge is disposed below its surface for slitting responsive to the movement of said plate member occasioned by hammer impacts to said handle member, and a slotted member extending between the furcations of said shank to receive said slitting tool and retain such in adjusted position along said furcated shank.

4. In a device of the character described, the combination with an elongated surface plate member for traversing over a surface to be slitted, of an upwardly inclined shank extending from said surface member, a handle member connected to said inclined shank, a slitting tool adjustably mounted on said inclined shank to project between the furcations of said surface member so that its cutting edge is disposed below its surface for slitting responsive to the movement of said plate member occasioned by hammer impacts to said handle member, and a slotted tool mount to receive said slitting tool for adjusted attachment along said inclined shank member.

GEORGE M. WALRAVEN.